Figure 1:
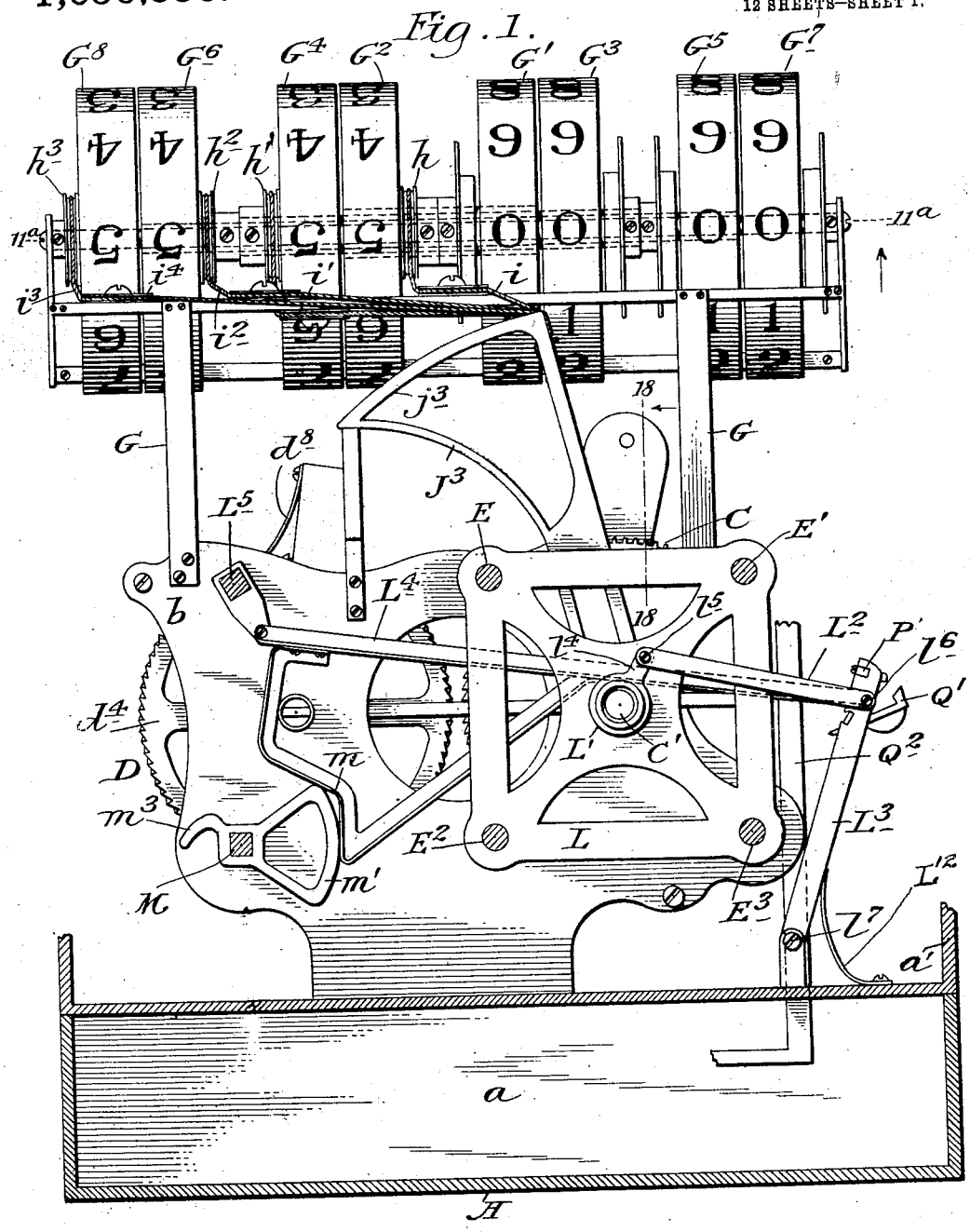

F. KRONENBERGER.
CASH REGISTER.
APPLICATION FILED APR. 19, 1910.

1,056,556.

Patented Mar. 18, 1913.
12 SHEETS—SHEET 2.

WITNESSES
Geo. A. Senior
A. R. Appleman

INVENTOR
Ferdinand Kronenberger.
BY
Griffins Bernhard
ATTORNEYS

F. KRONENBERGER.
CASH REGISTER.
APPLICATION FILED APR. 19, 1910.

1,056,556.

Patented Mar. 18, 1913.
12 SHEETS—SHEET 5.

WITNESSES
Geo. A. Lemon
A. R. Appleman

INVENTOR
Ferdinand Kronenberger
BY
Griffin & Bernhard
ATTORNEYS

F. KRONENBERGER.
CASH REGISTER.
APPLICATION FILED APR. 19, 1910.
1,056,556.
Patented Mar. 18, 1913.
12 SHEETS—SHEET 6.
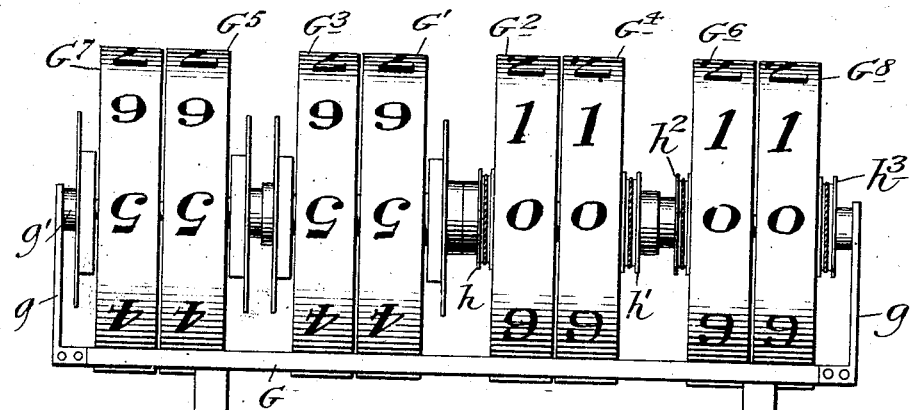
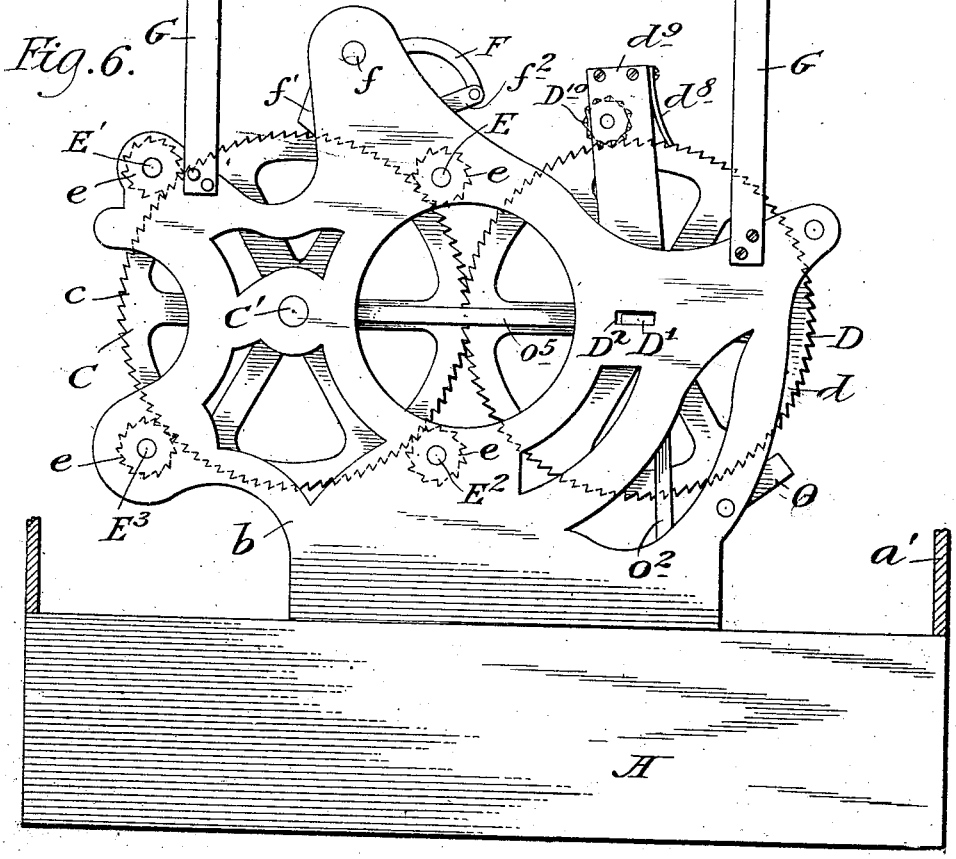
Fig. 6.
WITNESSES
Geo. A. Semn
AR Appleman
INVENTOR
Ferdinand Kronenberger
BY
Griffin Bernhard
ATTORNEYS

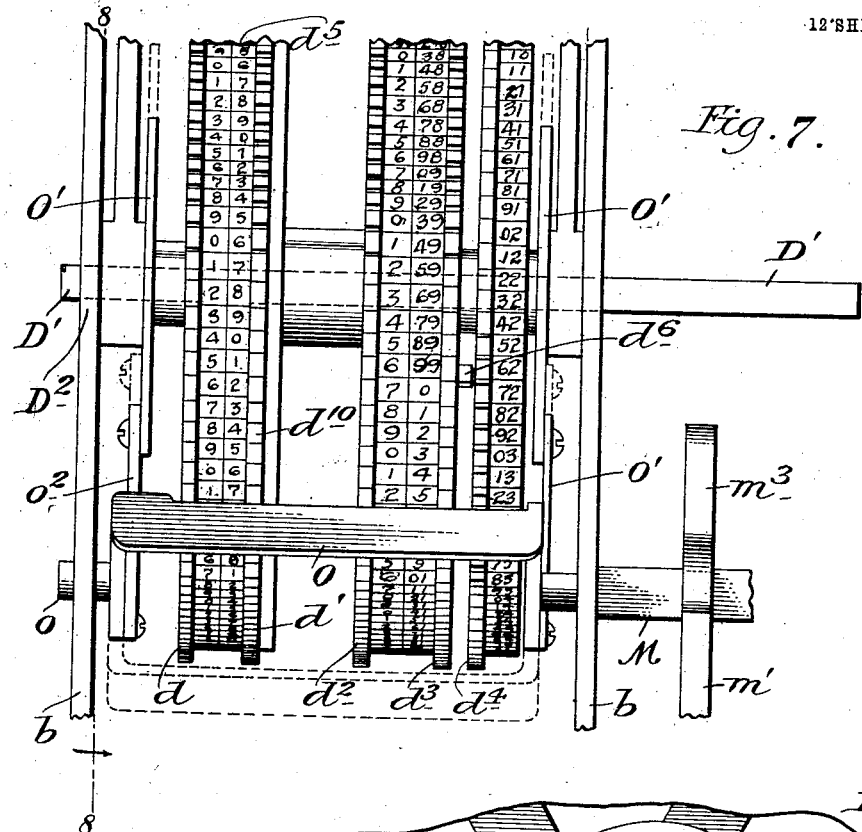
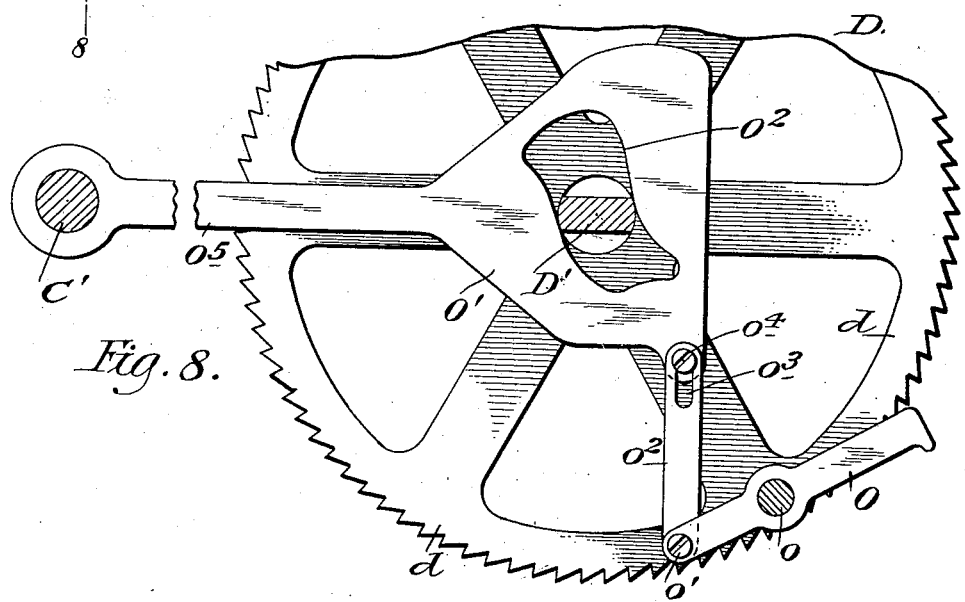

F. KRONENBERGER.
CASH REGISTER.
APPLICATION FILED APR. 19, 1910.
1,056,556.
Patented Mar. 18, 1913.
12 SHEETS—SHEET 8.
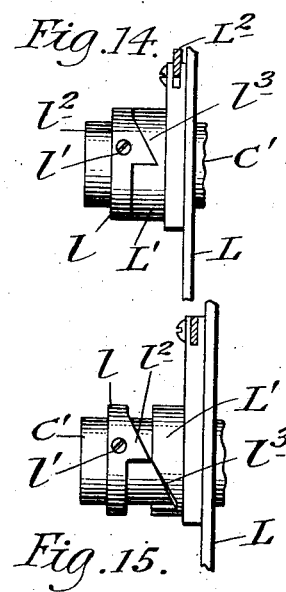
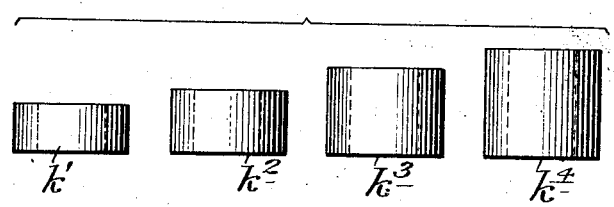
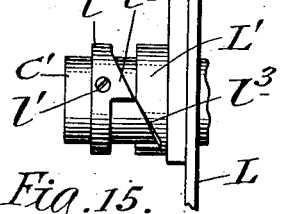
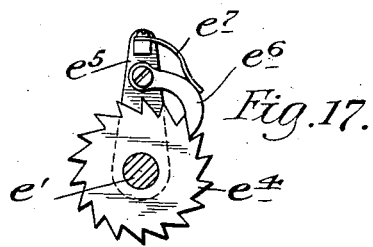
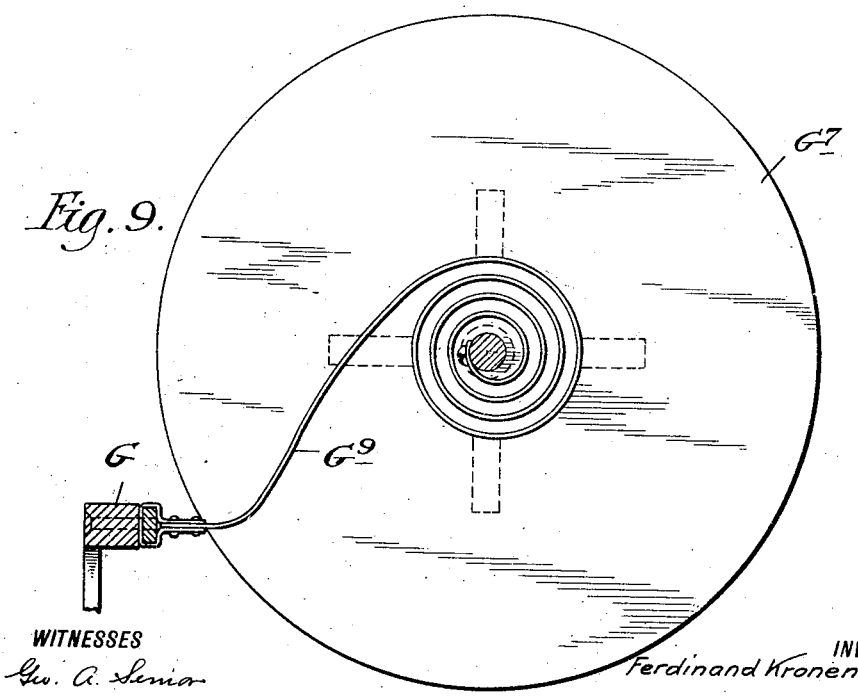
WITNESSES
INVENTOR.
Ferdinand Kronenberger.
BY
ATTORNEYS F. KRONENBERGER.
CASH REGISTER.
APPLICATION FILED APR. 19, 1910
1,056,556.
Patented Mar. 18, 1913.
12 SHEETS—SHEET 9.
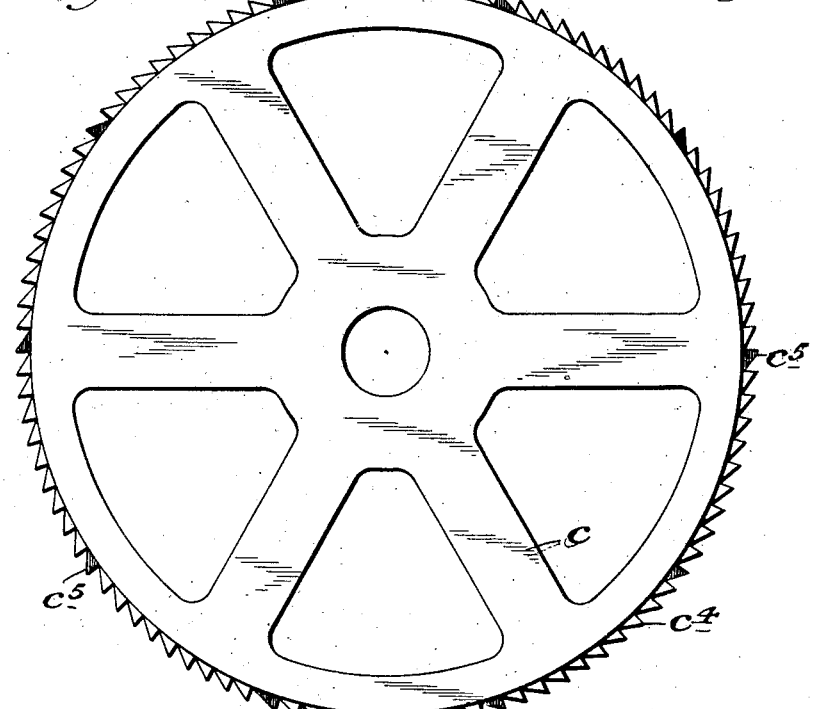
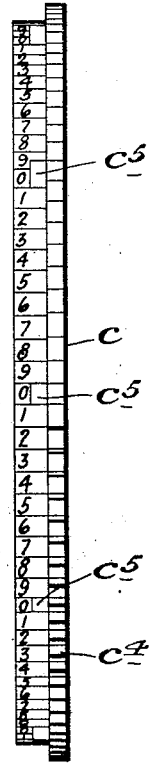
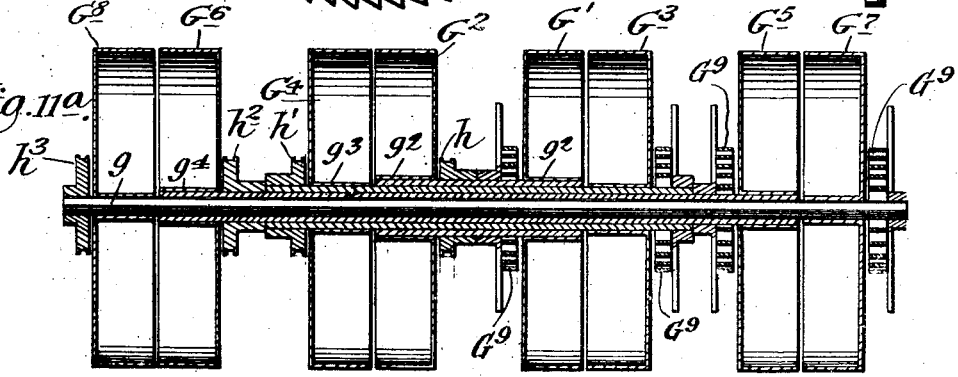
WITNESSES
INVENTOR.
Ferdinand Kronenberger.
BY
ATTORNEYS F. KRONENBERGER.
CASH REGISTER.
APPLICATION FILED APR. 19, 1910.
1,056,556.
Patented Mar. 18, 1913.
12 SHEETS—SHEET 10.
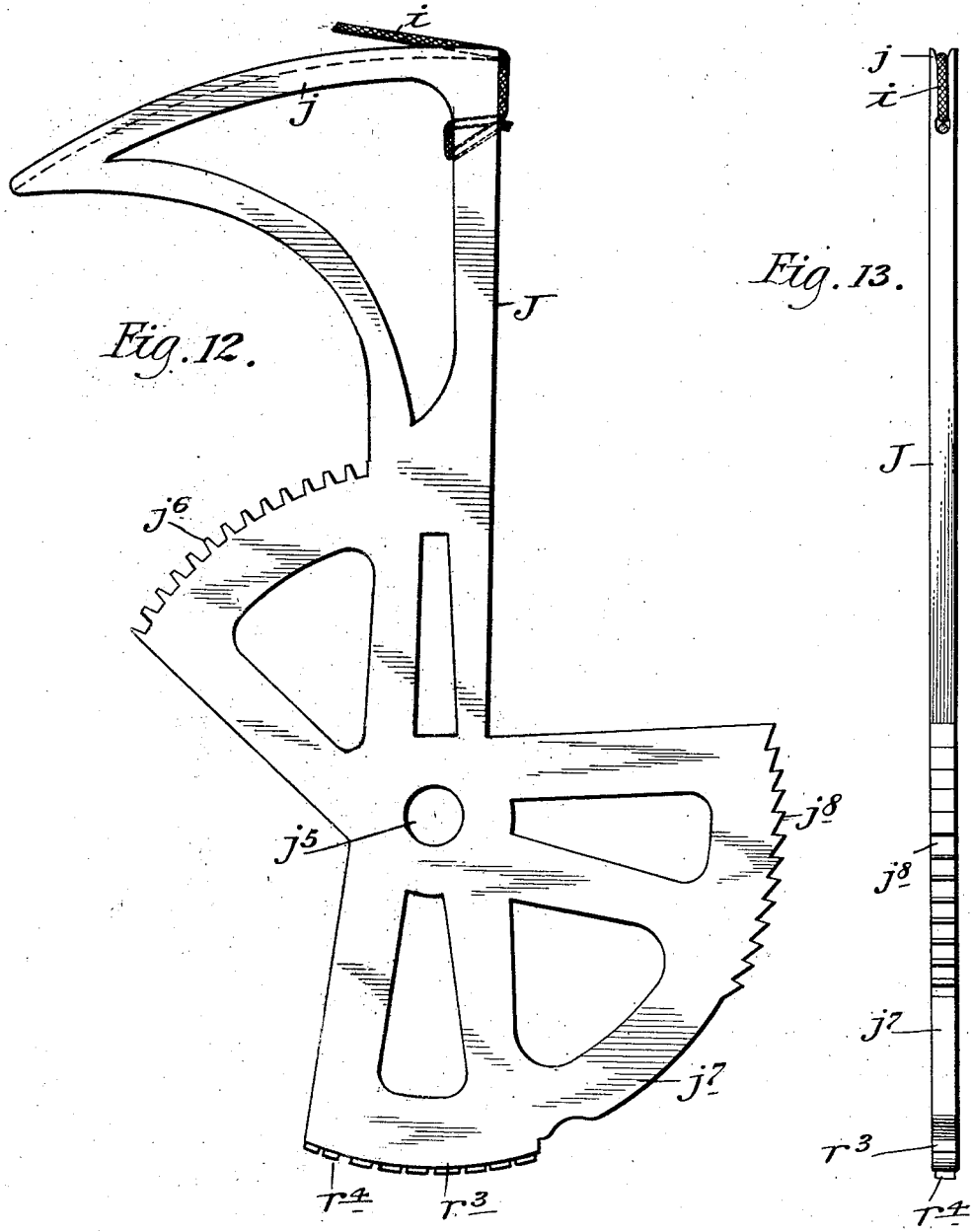
WITNESSES
INVENTOR
Ferdinand Kronenberger
BY
ATTORNEYS

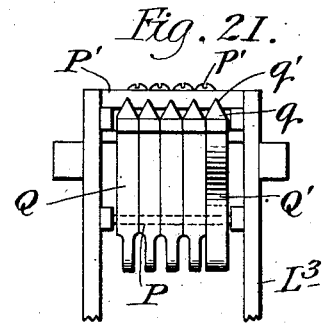
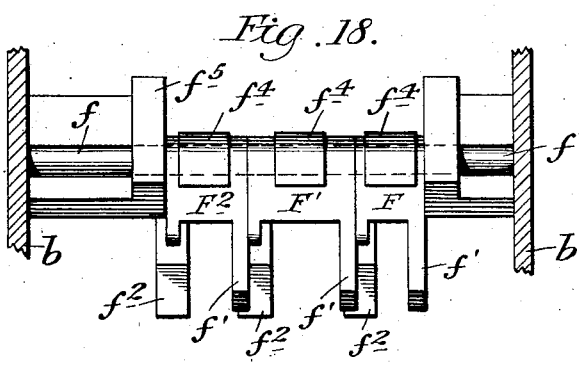
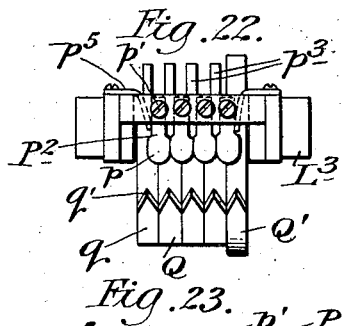
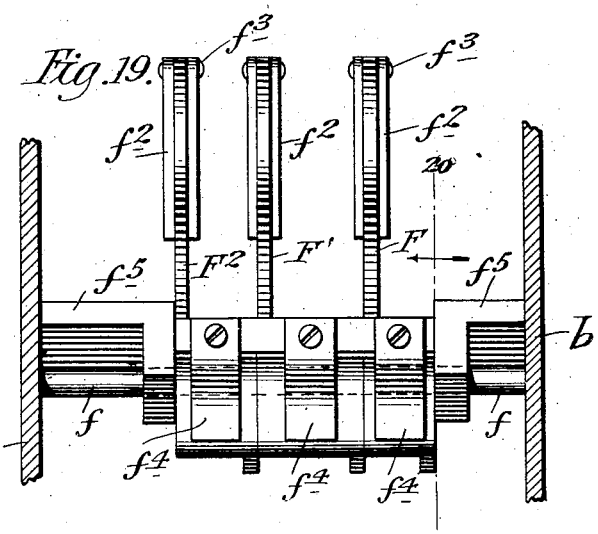
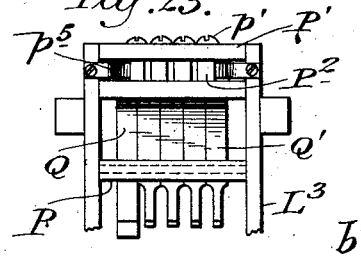
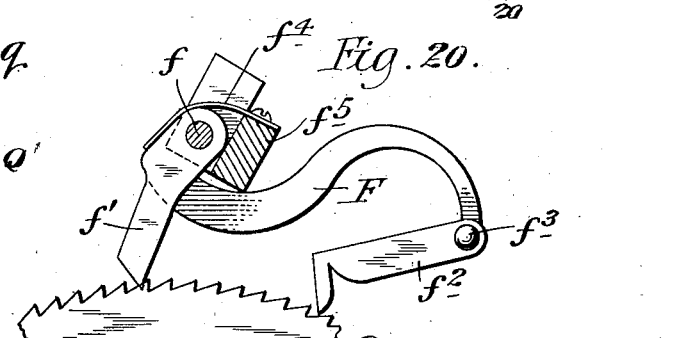

F. KRONENBERGER.
CASH REGISTER.
APPLICATION FILED APR. 19, 1910.
1,056,556. Patented Mar. 18, 1913.
12 SHEETS—SHEET 12.
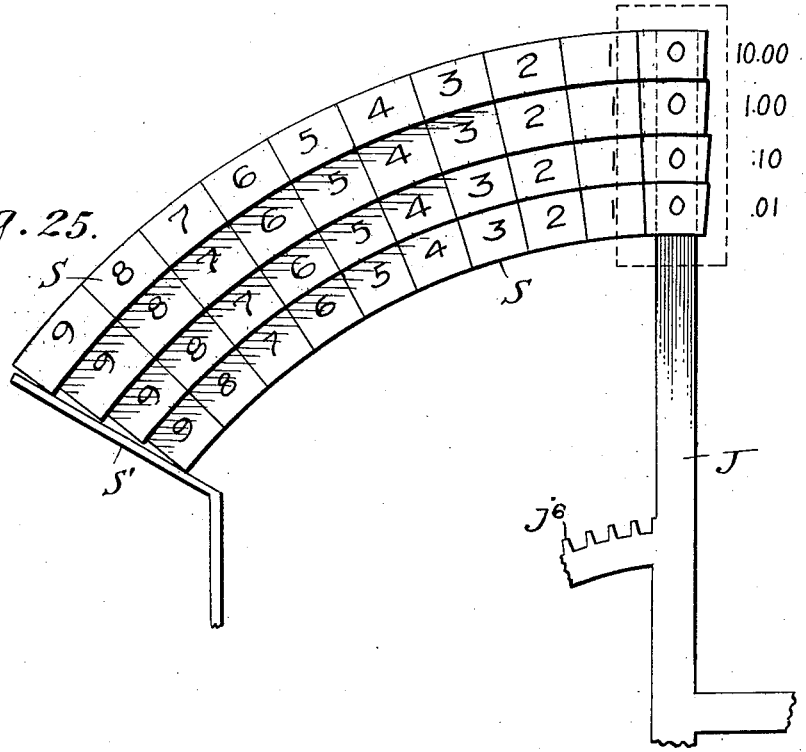
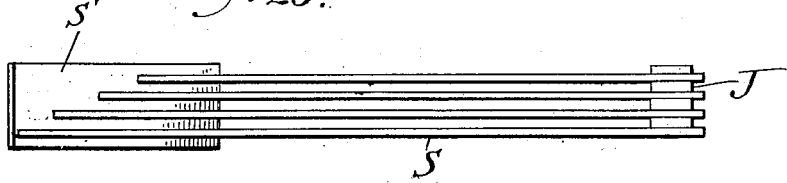
WITNESSES
Geo. A. Senior
A. R. Appleman
INVENTOR
Ferdinand Kronenberger
BY
Griffin Bernhard
ATTORNEYS

UNITED STATES PATENT OFFICE.

FERDINAND KRONENBERGER, OF CORONA, NEW YORK, ASSIGNOR OF ONE-THIRD TO ROBERT STEWART AND ONE-SIXTH TO RALPH G. BARCLAY, OF BROOKLYN, NEW YORK.

CASH-REGISTER.

1,056,556.

Specification of Letters Patent.

Patented Mar. 18, 1913.

Application filed April 19, 1910. Serial No. 556,406.

*To all whom it may concern:*

Be it known that I, FERDINAND KRONENBERGER, a citizen of the United States, residing in Corona, Long Island, county of Queens, and State of New York, have invented a certain new and useful Cash-Register, of which the following is a specification.

This invention is a cash register, and it pertains, more particularly, to a machine which omits separate levers or keys for operating the various parts which add the numbers or amounts.

Among other features of novelty, the invention embodies a machine wherein there is employed the following distinctly new mechanisms: a daily register composed of a plurality of rotatable counting wheels operated by the rotation of spindles by the operator; a total register composed of a plurality of counting wheels which are positioned in coöperative relation to the counting wheels of the daily register; means for shifting the total register out of coöperative relation to the daily register, and for locking said daily register in such non-coöperative position, while the operator is engaged in restoring the daily register to a normal or zero position; indicating mechanism operated by the rotatable spindles for displaying to the view of the customer and the operator the numbers added by the daily register; and locking mechanism for the several operating parts so as to preclude tampering with the correct working of the mechanisms.

Other features of the invention will appear from the annexed detailed description and the accompanying claims.

In the accompanying drawings I have illustrated different practical embodiments of the invention, but the constructions shown therein are to be understood as illustrative, only, and not as defining the limits of the invention.

Figure 2:
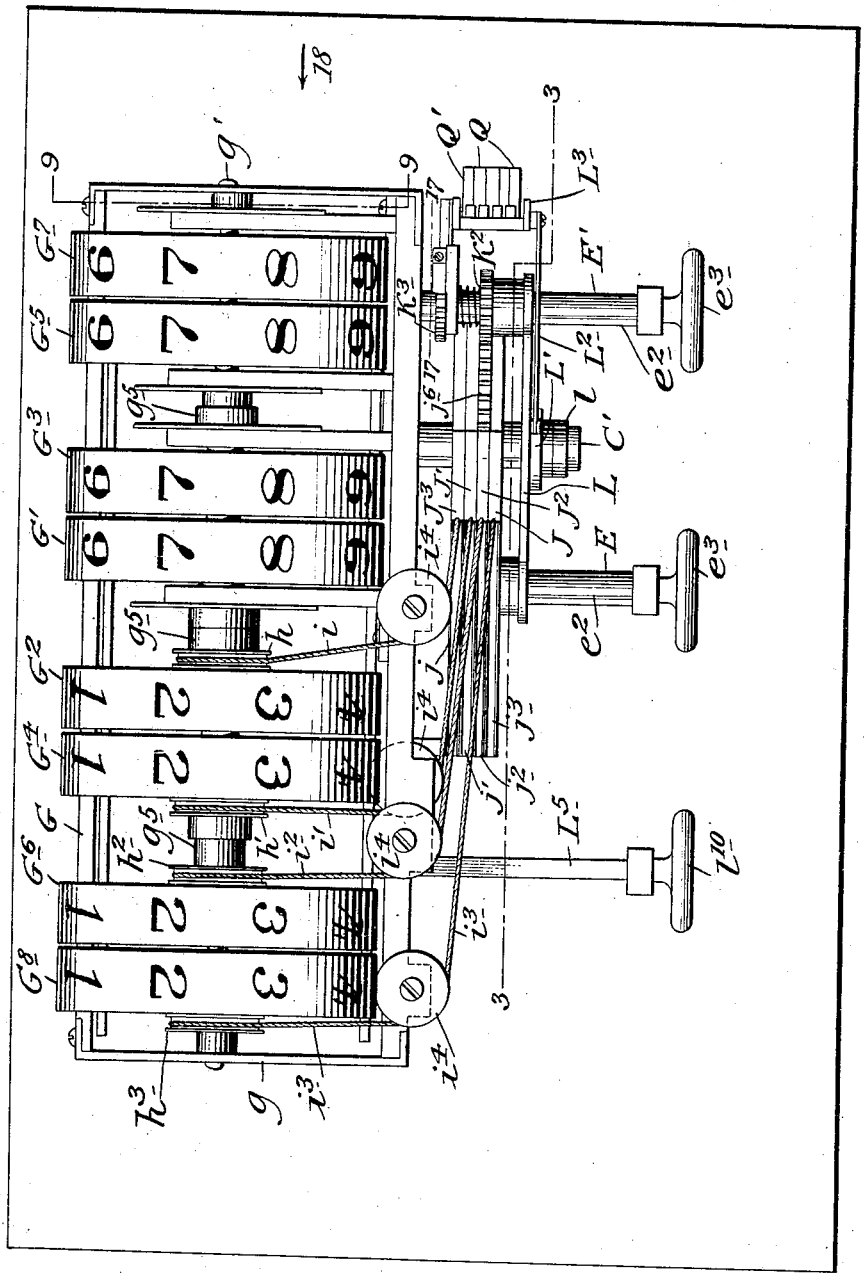
Figure 3:
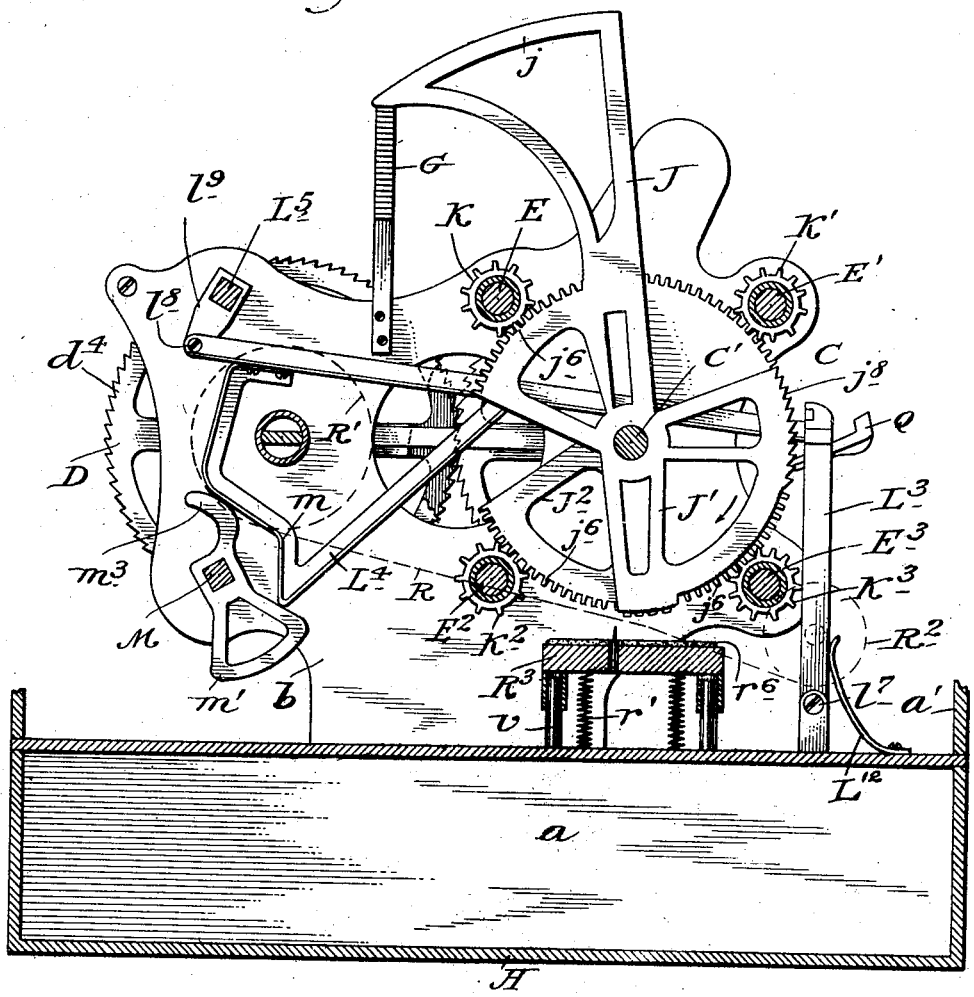
Figure 4:
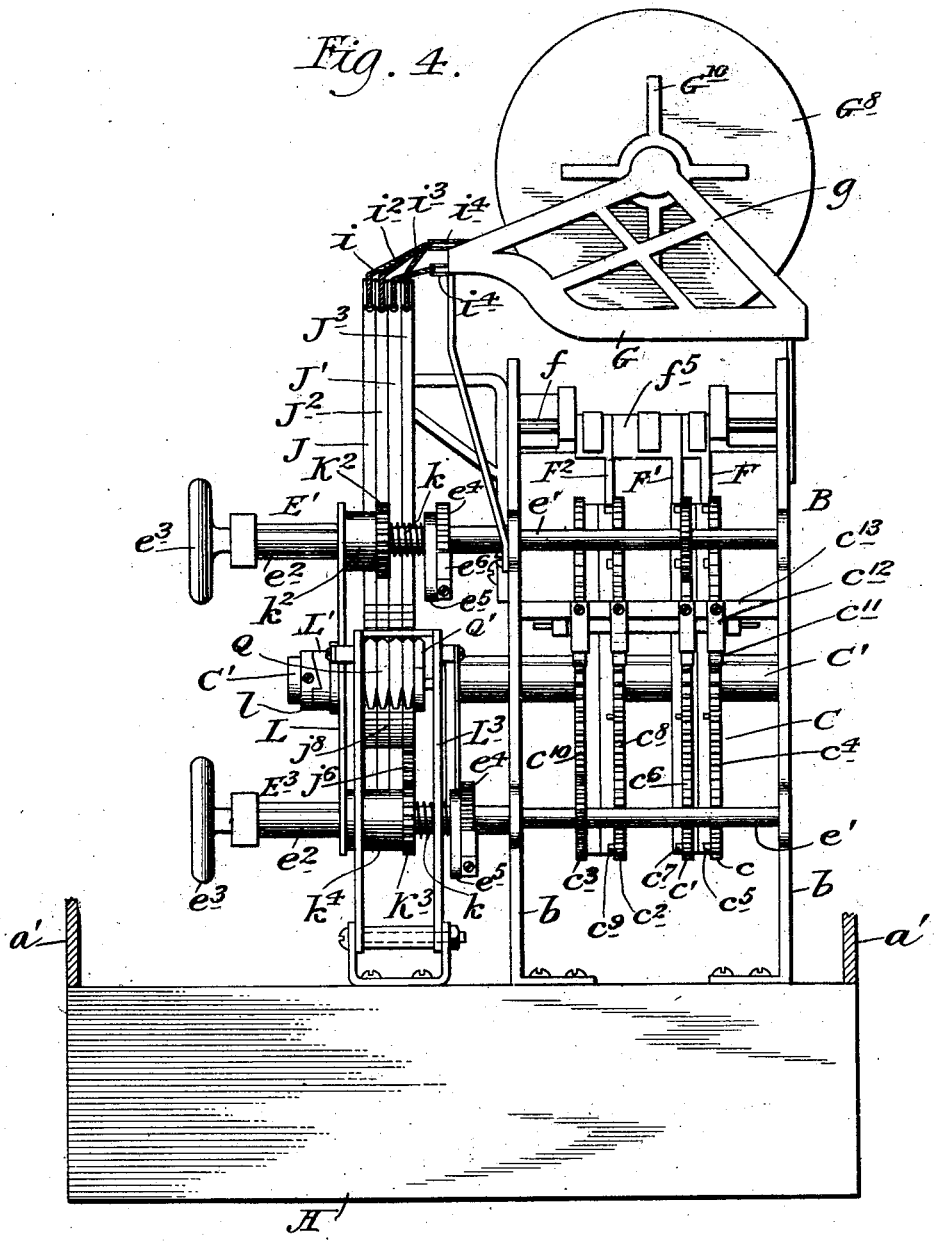
Figure 5:
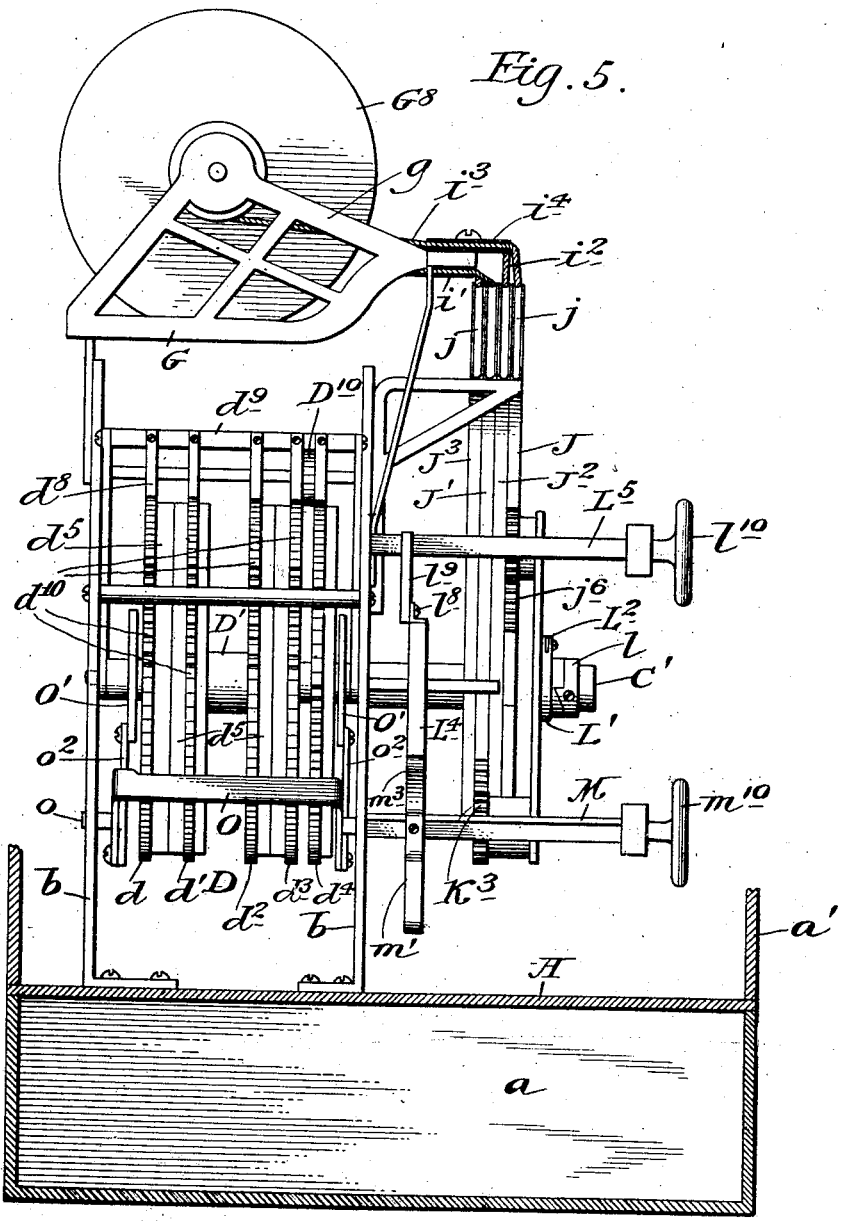

Figure 1 is a front elevation of a machine embodying this invention, the casing being omitted and certain of the parts being shown in section. Fig. 2 is a plan view of the machine shown in Fig. 1. Fig. 3 is a vertical section taken in the plane of the dotted line 3—3 of Fig. 2, the indicating mechanism being omitted. Fig. 4 is an elevation looking at the right hand end of the machine illustrated in Figs. 1, 2, and 3. Fig. 5 is an elevation looking at the opposite end of the machine. Fig. 6 is a rear elevation. Fig. 7 is an enlarged detail view looking at the left end of the machine and showing the total register mechanism. Fig. 8 is a detail section on the line 8—8 of Fig. 7 looking in the direction of the arrow. Fig. 9 is a detail vertical section on the line 9—9 of Fig. 2 showing one of the indicating devices. Fig. 10 is an enlarged detail view in side elevation of one of the counting wheels associated with the daily register. Fig. 11 is an edge view of the counting wheels shown in Fig. 10. Fig. 11$^a$ is a vertical longitudinal section through one form of indicating mechanism on the line 11—11 of Fig. 2 looking in the direction of the arrow. Figs. 12 and 13 are views in side elevation and edge elevation, respectively, of one of the actuating members whereby the indicating mechanism is operated. Figs. 14 and 15 are detail views of the cam operated means for positively actuating a throw-off device by which the actuating members for the daily register and the indicating mechanism are thrown out of operative relation to the spindles when the total register is disconnected from the daily register, thereby enabling an operator to return the daily register to zero without affecting the total register. Fig. 16 is a detail view illustrating spacing sleeves or collars of different lengths which are associated with the throw-off device and the actuating members. Fig. 17 is a detail sectional view on the line 17—17 of Fig. 2. Fig. 18 is an elevation looking at the right hand end of the machine and illustrating the transfer device on an enlarged scale, said transfer device being adapted for coöperation with the counting wheels of the daily register. Fig. 19 is a plan view of the parts shown in Fig. 18. Fig. 20 is a detail section on the line 20—20 of Fig. 19 looking in the direction of the arrow. Fig. 21 is a detail view in side elevation illustrating a locking mechanism whereby the spindle operated members are precluded from movement when the total register is shifted from operative relation to the daily register. Fig. 22 is a plan view of the parts shown in Fig. 21. Fig. 23 is a rear elevation of the parts shown in Figs. 21 and 22. Fig. 24 is a side elevation of the parts shown in Figs. 21 to 23, respectively. Figs. 25 and 26 are views in side elevation and plan, respectively, illustrating another form of indicating mechanism which may be combined with the spindle operated members.

A indicates a base provided with a chamber, $a$, shown in Fig. 1, whereby said base is adapted to receive a cash drawer (not shown), said cash drawer being slidable relative to the base. Upon this base is erected a casing for closing the operative parts of the machine, a portion of said casing being indicated by $a'$. The base supports, also, side plates, $b$, $b$, of a main frame, B, adapted to carry the various working parts of the machine. In this frame is mounted a daily register mechanism indicated generally by the reference character, C, and a total register mechanism indicated in its entirety by the reference character, D, the daily register being at the right hand portion of the frame, and the total register at the left hand portion of the frame.

The total register mechanism, C, comprises a plurality of wheels, $c$, $c'$, $c^2$, $c^3$, which are mounted loosely for rotation on a shaft, C', supported in plates, $b$, $b$, of the frame. The wheels, $c$, $c'$, $c^2$, $c^3$, are the units, tens, hundreds, and thousands wheels of said daily register mechanism. Wheel, $c$, is provided with ratchet teeth, $c^4$, and transfer teeth, $c^5$, at regular intervals. Wheel, $c'$, is provided with ratchet teeth, $c^6$, and transfer teeth, $c^7$, at regular intervals. In a similar manner wheel, $c^2$, has ratchet teeth, $c^8$, and transfer teeth, $c^9$, at regular intervals, whereas, thousands wheel, $c^3$, is provided with ratchet teeth, $c^{10}$, there being no transfer teeth on the thousands wheel, $c^3$. The several wheels of the daily register are adapted to turn freely on shaft, C', but they are prevented from turning in a backward direction by means of check pawls, $c^{11}$, held into engagement with the ratchet teeth thereof, by spring, $c^{12}$, said pawls and the springs being attached to a supporting bar, $c^{13}$, fixed to frame plate, $b$, $b$. Coöperating with the several wheels of the daily register are spindles, E, E', E$^2$, and E$^3$, each of said spindles having a gear, or a ratchet gear, $e$, positioned for coöperation with one counting wheel of the daily register, C, see dotted lines in Fig. 6. The series of spindles are grouped around the counting wheels of the daily register so that the spindles will be separated for easy access and convenient manipulation, and the gears or ratchet gears, $e$, will mesh with the ratchet teeth of the respective counting wheels, whereby each counting wheel will be operated positively and directly by the spindle associated therewith. The spindles are adapted to operate the counting wheels of the daily register for the purpose of recording the amounts represented by cents, dimes, dollars, and tens of dollars. Each operating spindle consists of two members, $e'$, $e^2$, the former, $e'$, being preferably a solid shaft, whereas the latter, $e^2$, is tubular, said parts, $e'$, $e^2$, being in alinement with each other so that an end portion of member, $e'$, is received within an adjacent end portion of tubular member, $e^2$. The tubular member is provided with an operating knob, $e^3$, and the two parts, $e'$, $e^2$, of the spindle are connected operatively by ratchet and pawl mechanism shown more clearly in Fig. 17. The ratchet wheel, $e^4$, is secured rigidly to solid member, $e'$, and to the inner portion of tubular member, $e^2$, is rigidly fastened a carrying arm, $e^5$, to which arm is pivoted a pawl, $e^6$, which is pressed by a spring, $e^7$, normally into engagement with the teeth of ratchet, $e^4$. The described construction enables the spindle to be operated, and to be returned to a zero position without effecting the relation of gear, or ratchet gear, $e$, with the teeth of the counting wheel. When the knob, $e^3$, is turned in one direction to operate tubular part, $e^2$, of the spindle, said part turns arm, $e^5$, and pawl, $e^6$, so that the pawl will turn the ratchet, $e^4$, and solid spindle part, $e'$, a corresponding distance, whereupon gear, $e$, will turn the counting wheel of the daily register a similar distance.

Associated with the several counting wheels of the daily register is a transfer mechanism by which, at regular intervals, the sums will be carried from a wheel of a lower denomination to the next adjacent wheel of a higher denomination, as for example, when wheel, $c$, is rotated a distance representing ten cents, one element of the transfer device will be operated to carry the tens from units wheel, $c$, to the next adjacent wheel, or tens wheel, $c'$, and in like order, wheel, $c'$, will operate another element of the transfer device to carry hundreds to wheel, $c^2$, and similarly thousands will be carried from wheel, $c^2$, to wheel, $c^3$.

F, F', F$^2$ are a series of levers hung loosely on an arbor or spindle, $f$, supported in frame plate, $b$, $b$, above the daily register. Said levers of the transfer device, shown more clearly in Figs. 18, 19, and 20, are each provided with an arm, $f'$, and a pawl, $f^2$, the latter being pivoted to said lever by a pin, $f^3$. The arm, $f'$, is positioned on the lever in a different vertical plane from pawl, $f^2$, and said lever is held in an operative position by a spring, $f^4$, which is attached to a cross bar, $f^5$, supported adjacent to rock shaft, $f$. The arm, $f'$, of lever, F, is positioned in the path of transfer teeth, $c^5$, on units wheel, $c$, of the daily register, whereas the arm, $f^2$, of said lever, F, is adapted for engagement with tooth, $c^6$, of the tens wheel, $c'$. As units wheel, $c$, turns the distance equivalent to ten teeth, arm, $f'$, of lever, F, will engage with one transfer tooth, $c^5$, so as to turn lever, F, on its pivot, $f$, thereby actuating pawl, $f^2$, so as to engage with a tooth, $c^6$, of wheel, $c'$, whereby said tens wheel, $c'$, will be moved the distance of one tooth by the operation of transfer lever, F, from units wheel, $c$. In like manner, the arm, $f'$, of lever, F', is positioned for engagement with a transfer tooth, $c^7$, of tens wheel, $c'$, whereas pawl, $f^2$, of said lever, F', is adapted for engagement with teeth, $c^8$, of hundreds wheel, $c^2$. In a similar manner, the arm, $f'$, of lever, $F^2$, is positioned for engagement with either of the transfer teeth, $c^9$, on the hundreds wheel, $c^2$, whereas the arm, $f^2$, of said lever, $F^2$, will engage with teeth, $c^{10}$, of thousands wheel, $c^3$.

In the upper part of the machine is a horizontal frame, G, supported by main frame, B, and adapted to carry the parts composing a duplex indicating mechanism. Said frame, G, is provided at its ends with standards, $g$, adapted to support a horizontal rod or arbor, $g'$. On this arbor is loosely mounted a sleeve or tubular shaft, $g^2$, which carries two indicator wheels, G', $G^2$, each wheel being inscribed with numbers from 0 to 9, both inclusive. Another sleeve, $g^3$, is loosely mounted on said arbor and sleeve, $g^2$, and it is equipped with indicator wheels, $G^3$, $G^4$, each of said wheels being numbered as described. A third sleeve or tubular shaft, $g^4$, is, also, mounted on the arbor for the purpose of carrying other indicator wheels, $G^5$, $G^6$, and a fourth sleeve, $g^5$, carries indicator wheels, $G^7$, $G^8$. The sleeves or tubular shafts are adapted to rotate freely and separately on the arbor, and said shafts are so positioned that wheels, $G^2$, $G^4$, $G^6$, $G^8$, are at one end of the machine so as to be exposed through a suitable slot in the machine casing to the view of the operator, whereas the other wheels, G', $G^3$, $G^5$, $G^7$, are at the opposite end of the machine for the purpose of exposing the numbers on said wheels through another slot of the machine so that the wheels comprised in the last named group, G', $G^3$, $G^5$, $G^7$, will be exposed to the view of the customer or purchaser. The several sleeves, $g^2$, $g^3$, $g^5$, arbor $g$ are provided with pulleys, $h$, $h'$, $h^2$, $h^3$, respectively, and on these pulleys are coiled the corresponding end portions of pliable chains or other flexible connections indicated at $i$, $i'$, $i^2$, $i^3$. Said chains or flexible connections run around pulleys, $i^4$, mounted on frame, G, and the several operating connections extend to grooved segments, $j$, $j'$, $j^2$, and $j^3$, respectively, on actuating members, J, J', $J^2$, $J^3$. Each chain or flexible connection is attached securely to one of the actuating members, J, whereas the other end of said chain or flexible connection is partly coiled around the pulley on one shaft, said coiled end of the chain being fastened to said pulley, whereby as the actuating member is operated by turning one of the spindles, by the means presently described, the flexible connection will be pulled for the purpose of turning the pulley and the corresponding shaft, thus displaying the numbers on two indicating wheels to the view of the operator and the customer.

Each actuating member is constructed substantially as shown in Figs. 12 and 13 of the drawings by casting said member in a single piece of metal. The cast member is provided with an aperture, $j^5$, and the several members, J, J', $J^2$, $J^3$, are assembled compactly and in sidewise relation, as shown in Figs. 2, 4, and 5, whereby the series of numbers are adapted to be mounted loosely upon the horizontal arbor or spindle, C', of the daily register mechanism. Said members are capable of turning freely on said arbor, C', and the movement of one member does not affect or change the position of either of the other members of the series. Each member is provided in addition to the grooved head, $j$, with a gear segment, $j^6$, on one side of the opening, $j^5$, and the member is provided with a segmental rim, $j^7$, having ratchet teeth, $j^8$, said rim and the ratchet teeth being at the opposite side of opening, $j^5$, in the member, all as clearly shown in Fig. 12. Members, J, J', $J^2$, $J^3$, are positioned in different vertical planes and in parallel order, and with the gear segments, $j^6$, of said members mesh the teeth of gear pinions, K, K', $K^2$, $K^3$, which are carried by arbors, E, E', $E^2$, $E^3$, respectively, as shown more clearly in Fig. 3. The gears just referred to are held on the group of operating spindles so as to occupy different vertical planes in order to bring them into proper positions for intermeshing engagement with the gear segments, $j^6$, of the respective actuating members. Co-operating with each gear is a coiled spring, $k$, coiled loosely on tubular part, $e^2$, of the respective spindles, one end of said spring acting against the arm, $e^5$, of said spindle part, whereas the other end of the spring, $k$, acts against the gear to press said gear into engagement with one of a series of spacing collars, $k'$, $k^2$, $k^3$, $k^4$, said spacing collars being of different lengths as shown in Fig. 16. Said spacing collars engage with a throw-off plate, L, which is provided at its several corners with openings whereby said throw-off plate will receive the tubular part, $e^2$, of the several operating spindles, the throw-off plate being movable slidably upon the spindles in a manner presently described. The throw-off plate engages with all the collars, $k'$, $k^2$, $k^3$, $k^4$, of different lengths so as to retain the gears in mesh with the gear segments on the actuating members, but when this throw-off plate, L, is moved positively in one direction, it acts on the spacing collars to shift the gears along the arbors and free them from meshing engagement with the gear segments of actuating members, J, J', J², J³, whereby the spindles are thrown out of operative engagement with the actuating members for the indicator disks, thus preventing the operator from turning the indicator disks by manipulating the operating spindles at a time when the total register is out of operative relation to the daily register. An end portion of arbor or spindle, C', extends loosely through throw-off plate, L, as shown more clearly in Fig. 4, and on said end portion of the shaft is fixed a collar, $l$, by means of a set screw $b'$. This collar is provided with a cam surface, $l^2$, as shown more clearly in Figs. 14 and 15, and coöperating with the cam surface of the fixed collar is a moving collar, L', the latter being loosely mounted on arbor, C', between fixed collar, $l$, and throw-off plate, L. The movable collar is provided with a cam surface, $l^3$, adapted to coöperate with cam surface, $l^2$, of the fixed collar, and said moving collar, L', is provided with an outwardly extending arm, $l^4$. To the end of this arm is pivoted by pin, $l^5$, one end of a link, L², the other end of said link being connected by a pin, $l^6$, to an upright vibratory frame, L³. Said frame is positioned at the right hand end of the machine so as to be pivotally supported thereon by pin, $l^7$, and to the frame is pivoted one end of a peculiarly shaped link, L⁴, the same being shown more clearly in Fig. 3. Said link is preferably cast in a single piece of metal and it extends across the machine alongside one of the frame plates, $b$, preferably between the frame plate and the actuating members for the indicating mechanism. The other end of said link, L⁴, is connected by a pin or screw, $l^8$, to an arm, $l^9$, on an operating shaft, L⁵, the latter being mounted in one of the frame plates, $b$, so as to extend downwardly therefrom, and to occupy a spaced relation to the group of operating spindles heretofore described. The spindle is provided with a knob, $l^{10}$, by which said spindle may be conveniently rotated for the purpose of imparting reciprocating movement to link, L⁴, and pivoted frame, L³, whereby link, L², is actuated to turn the shifting collar, L', thus pressing the cam surface, $l^3$, of said collar into position to ride upon the cam surface, $l^2$, of the fixed collar, $l$. When the collar, L', is turned in one direction, the notch of said collar will receive the cam surface, $l^2$, of the fixed collar, thus allowing the springs, $k$, to press the gear pinions into mesh with the gear segments of the actuating members, and to retain the spacing collars into engagement with the throw-off plate. The link, L⁴, is provided with an inset or cam portion, $m$, which is shaped to correspond with a locking member, $m'$, on a locking spindle, M, the latter being mounted for rotation in one of the frame plates, $b$, and positioned below the operating spindle, L⁵, by which the throw-off plate is actuated. The locking spindle, M, is provided with a separate operating knob, $m^{10}$, and spindles, M, L⁵, are adapted for individual operation when the total register is to be thrown out of coöperative relation to the daily register. Locking member, $m'$, of spindle, M, is provided with a stop member, $m^3$, which is adapted to be positioned in the path of the inset part, $m$, on link, L⁴, as shown in Fig. 3, for the purpose of limiting the movement of said link, L⁴, in one direction when the parts occupy said position of Fig. 3. When the total register, presently described, is moved out of coöperative relation to the daily register, so that the two registers occupy the disengaged positions illustrated in Fig. 1, frame, L³, is moved by link, L⁴, operated by spindle, L⁵, to said position of Fig. 1, and spindle, M, is then turned to bring the locking member, $m'$, into coöperative engagement with the inset part, $m$, of link, L⁴, as shown in said Fig. 1, thus locking the daily register in its disengaged position. At the same time, frame, L³, acts on link, L², so as to turn collar, L', for the cam surface, $l^3$, to ride upon cam surface, $l^2$, and press the throw-off plate, L, against the spacing collars, whereby the spacing collars and the gears are moved along the tubular members, $e^2$, of the operating spindles, thus disconnecting said gears from the gear segments, $j^6$, on the actuating members, J, J', J², J³, whereby said actuating members cannot be operated by the spindles for the purpose of turning the indicating mechanism.

The rotatable wheels of the indicating mechanism are returned normally to zero positions by the action of springs, one of said springs being indicated by G⁹ of Fig. 9. Said spring is shown as being coiled around a sleeve carrying the indicator member, the other end of said spring being attached to a part of frame, G. Any suitable stop devices, such as a radial arm G¹⁰, adapted to coöperate with a suitable stop (not shown) on the machine frame, may be employed for arresting the return movement of the indicator member when it reaches the zero position, but as this minor feature of the stop device may be readily supplied by a skilled constructor, it has not been deemed necessary to illustrate it.

The total register, indicated generally by the reference character, D, comprises a plurality of counting wheels, $d$, $d'$, $d^2$, $d^3$, $d^4$, each of which is provided with peripheral teeth, $d^{10}$, adapted to engage with the teeth on the periphery of counting wheels, $c'$, $c^2$, $c^3$, respectively, the counting wheel, $d^4$, of the total register being free from engagement with either of the counting wheels of the total register. Said counting wheels of the total register are mounted on a suitable shaft, D', which is fitted in slots, D², of frame plate, b, so that the shaft and the counting wheels will be capable of a limited sliding movement sufficient to disengage the counting wheels of the total register from the counting wheels of the daily register. The counting wheels, d, d', d², d³, d⁴, are provided with flanges, d⁵, on which are inscribed numbers, as shown in Fig. 7. The rows of numbers on counting wheel, d, run reversely to the rows of numbers on counting wheel, d'. Similarly, the rows of numbers on counting wheel, d², run reversely to the numbers on counting wheel, d³. The numbers on the counting wheel, d⁴, run reversely to the numbers of the adjacent counting wheel, d³. As shown in Figs. 5 and 6, wheels d³ d⁴ of the total register are connected operatively by toothed wheels D¹⁰, positioned above said wheels and coöperating therewith for the purpose of transferring the registrations of wheel d³ to the wheel d⁴, so that the highest total numbers will be indicated by said wheel d⁴ of the total register. The several counting wheels of the total register are adapted to be actuated directly from the counting wheels of the daily register when the two registers are in coöperative relation so that the respective counting wheels will engage with each other, as shown in Fig. 3, but when the daily register is to be reset at the end of a day's business, then the spindles, L⁵, M, are operated for the purpose of moving the total register, D, to the disconnected position, and locking the several operating parts so that the machine cannot be tampered with by an unauthorized person.

The spindle, M, is mounted in one frame plate, b, as shown in Fig. 7, and to this spindle is rigidly fastened a yoke shaped piece, O, the other end of which is pivoted at o in the other frame plate, b. To the end portions of this yoke are pivoted by screws, o', the lower ends of links, o², the upper ends of which are provided with slots, o³, which receive pivot screws, o⁴, shown in Fig. 8, whereby the links, o², are loosely connected with operating levers, O'. Said levers are provided with arms, o⁵, which are hung loosely on arbor, C', of the daily register, and said levers, O', are provided with the cam slots, O², shown in Fig. 8, in which cam slots are received the shaft, D', of the total register, the construction of said slotted levers, O', being such that when yoke, O is turned by the operation of spindle, M, links, o², will operate slotted levers, O', in a manner for the cam slots, O², to move shaft, D', in a direction to adjust the counting wheels of the total register away from the counting wheels of the daily register. The operation of spindle, M, thus adjusts the daily register to its inoperative position, and at the same time moves locking projection, m', into engagement with the raised part, m, of link, L⁴; but when the link is adjusted to the position of Fig. 3, then spindle, M, may be turned, for its member, m³, to engage with link, L⁴, and at the same time turn yoke, O, for adjusting levers, O', so that the register will be restored into operative engagement with the counting wheels of the total register. The counting wheels of the total register are precluded from movement in a reverse direction by suitable spring pressed pawls, d⁸, shown in Fig. 5, said pawls being supported on a cross rod, d⁹, attached to frame plate, b.

Swinging frame, L³, carries means adapted for engagement with the ratchet teeth, j⁸, of each of the swinging actuating members, J, J', J², J³, whereby the indicating mechanism may be locked or retained for a limited time in the position to which said indicating mechanism may be adjusted for the purpose of displaying to the view of the customer and the operator the amount registered by the machine. As shown more particularly in Figs. 21 to 24, inclusive, said swinging frame, L³, is provided with a cross rod, P, and a supporting bar, P', the rod, P, being below the cross bar. On the rod are loosely hung a plurality of levers, Q, the upper ends of which are provided with heads, q, which are beveled at q', see Figs. 21 and 22. An additional lever, Q', is, also, hung on rod, P, at one side of the series of levers, Q, and this additional lever is adapted to coöperate with a drawer operating lever, Q², the position of which is shown more particularly in Fig. 1. As the means for operating the drawer, and the drawer itself, constitute no part of this invention, I have not considered it necessary to further illustrate or describe the drawer operating means. Supporting bar, P', is equipped with a plurality of dogs, P², having rounded heads, p, pivoted on said supporting bar, P', by screws or studs, p'. The heads of said pivoted dogs are positioned in the path of the beveled heads, q, on locking levers, Q. Said locking levers are provided with pawl shaped tail pieces, p³, which are adapted for engagement with the ratchet teeth, j⁸, on the actuating members, J' to J³, inclusive. When link, L⁴, occupies the position of Fig. 3 so that the daily and total registers are in coöperative relation, the indicating disks, G' to G⁸, both inclusive, occupy their zero positions, and the machine is otherwise in condition for operation. When one of the spindles, E to E³, inclusive, is operated, said spindle turns its proper gear and acts on the gear segment of one actuating member so that the actuating member will turn the proper indicator shaft for moving two of the indicator members to the displayed position. At this time the indicating member moves in the direction of the arrow in Fig. 3, and the ratchet teeth, $j^8$, of said indicating member will ride freely over the pawl shaped tail piece, $p^8$, of one of the locking levers, Q. When the actuating member and the indicating members come to rest, the lever, $Q'$, locks the actuating member in said adjusted position for the purpose of retaining the indicating members in their displayed positions for the desired time. To return the parts to normal positions, it is necessary for the operator to turn spindle, $L^5$, and adjust link, $L^4$, and frame, $L^3$, to the position shown in Fig. 1, thus moving the frame, $L^3$, and the levers away from the ratchet pawls of the actuating members, after which the spindle will be returned to position by spring, $G^9$, acting on the indicating disk so as to pull on one of the flexible connections which operate to turn the actuating member to its usual position. A spring, $L^{12}$, (see Figs. 1 and 3) is shown as coöperating with frame, $L^3$, for the purpose of returning the frame and the link, $L^4$, back to normal position when the operator finally turns spindle, $L^5$, back, whereby the recessed part, $m$, of link, $L^4$, will reengage with the stop member, $m^3$, of spindle, M, upon restoring the total register into coöperative relation to the daily register.

As is usual in machines of this kind, there is employed a record tape or strip indicated by dotted lines at R in Fig. 3. This record tape is coiled on a spool indicated by dotted lines at $R'$ and is adapted to be wound on a take-up spool shown by dotted lines, $R^2$, in Fig. 3. The record tape is adapted to pass over a printing table, $R^3$, guided by stems, $r$, and normally raised by spring, $r'$. The actuating members, J, $J'$, $J^2$, are provided with curved edges, $r^3$, having suitable type, $r^4$, said type being adapted to coöperate with table, $R^3$, for printing the proper numbers on the tape. Suitable inking mechanism may be employed, for instance, the inked pad, $r^6$, on said table, $R^3$, see Fig. 3. As the paper strip and the printing and inking mechanisms constitute no part of the present invention, I have not considered it necessary to more fully illustrate or describe the same.

The operation may be briefly summarized as follows: Assuming that it is desired to register nine cents in the machine, spindle, E, is operated so that its gear, K, will turn the toothed segment, $j^6$, of actuating member, J, whereupon the cord, $i$, will rotate shaft, $g^2$, and turn wheels, $G'$, $G^2$, to the position for indicating the number to the operator and the customer. At the same time gear, $e$, will mesh with the teeth of counting wheel, $c$, to turn the daily register, and thus indicate the amount of the purchase on said daily register. The counting wheel, $c$, of said daily register will in turn operate the counting wheel, $d$, of the total register. When actuating member, J, is moved, its ratchet teeth, $j^8$, clear the tail piece of lever, Q, and the actuating member is thus held in the desired position to display the amount of the purchase until the operator moves spindle, $L^5$, to disengage the lever, Q, from the ratchet teeth, whereupon the spring, $G^9$, returns the indicator and the actuating member to their normal positions, the spring, $L^{12}$, acting on frame, $L^3$, and link, $L^4$, so that the recessed part, $m$, of link, $L^4$, contacts with stop member, $m^3$. These operations are repeated each time an amount is to be registered, but at the end of a day's business, spindles, $L^5$, M, are operated so as to throw the total register out of engagement with the daily register, after which the parts of the daily register may be returned to zero positions without affecting the total register.

Instead of using the rotating disks, $G'$ to $G^8$, inclusive, as the indicating mechanism, I may employ the curved tablets shown in Figs. 25 and 26. Each actuating member, J to $J^3$, inclusive, is provided with a curved tablet, S, on which is inscribed the numbers from 0 to 9, inclusive. The series of tablets are positioned one above the other so as to display their numbers, the tablet of member, J, indicating units, the tablet of member, $J'$, indicating tens, the tablet of member, $J^2$, indicating hundreds, and the tablet of member, $J^3$, indicating thousands. The tablets when in normal position are adapted to contact with a rest or stop, $S'$. The actuating members, J to $J^3$, inclusive, are constructed with the gear segments and the ratchet teeth, as heretofore described, and they are adapted to be operated in the manner set forth, by the rotation of spindles, E to $E^3$, inclusive.

It will be noted that the numbers on wheels, $G^2$, $G^4$, $G^6$, $G^8$, run in a reverse direction to the numbers on indicating wheels, $G'$, $G^3$, $G^5$, $G^7$, so that the numbers on the two sets of wheels may be read from opposite sides of the machine by the salesman and the customer. Further, the wheels of the daily register, and the wheels of the total register are, or should be, provided with numbers so that the totals registered by the machine may be easily read by the operator and transferred to the account books. For convenience in reading, the numbers on the wheels of the daily register are read from left to right, as usual, but as the wheels of the total register coöperate with the wheels of the daily register, except wheel, $d^4$, the numbers on the wheels of the total register are read from right to left, see Fig. 7. As shown in Fig. 25, the indicating segments, S, are provided with scales, the radial lines of which converge to the pivots of members, J, so that the scales are uniform. Obviously, the segments, S, are provided with scales on the respective faces thereof.

As shown in Figs. 5 and 6, wheels, $d^3$, $d^4$, of the total register are connected operatively by toothed wheels, $D^{10}$, positioned above said wheels and coöperating therewith for the purpose of transferring the registrations of wheel, $d^3$, to the wheel, $d^4$, by which the highest total numbers will be indicated upon said wheel, $d^4$.

Having thus fully described the invention, what I claim as new, and desire to secure by Letters Patent is:

1. In a cash register, a daily register including a plurality of manually operable rotatable spindles, a plurality of counting wheels each operated by one of said spindles, and transfer devices coöperating with said counting wheels, in combination with a total register including a plurality of counting wheels positioned in coöperative relation to the individual wheels of the daily register and operated directly by said counting wheels of the daily register, and means for shifting the wheels of the total register into and out of such direct operative relation to the wheels of the daily register.

2. In a cash register, the combination of a daily register embodying a plurality of separate counting wheels and a plurality of spindles each having means for individually actuating the counting wheels of said daily register, a total register including a plurality of counting wheels, said counting wheels of the total register being positioned in coöperative relation to the counting wheels of the daily register to be actuated individually thereby, and means for shifting the counting wheels of the total register into and out of such coöperative relation to the counting wheels of the daily register.

3. In a cash register, a daily register including a plurality of separate counting wheels, a plurality of manually rotatable spindles each having a gear positioned to directly operate one of said counting wheels, and means for precluding backward rotation of said counting wheels, in combination with a total register having counting wheels positioned in mesh with the counting wheels of the daily register, means for shifting the counting wheels of the total register into and out of mesh with the wheels of the daily register, and means for locking the total register against movement when the counting wheels thereof are out of mesh with the daily register counting wheels.

4. In a cash register, the combination of a daily register having counting wheels and separate rotatable spindles for individually actuating said counting wheels, a total register including counting wheels operated individually and directly by the counting wheels of the daily register, and means for moving the counting wheels of one register into and out of coöperative relation to the counting wheels of the other register.

5. In a cash register, the combination of a daily register including a plurality of separate counting wheels and rotatable spindles for individually operating said counting wheels of the daily register, a total register including a plurality of counting wheels positioned for operation directly and separately by the counting wheels of said daily register, means for simultaneously adjusting the counting wheels of one register into and out of operative relation to the counting wheels of the other register, and means for resetting the counting wheels of the daily register to zero when free from engagement with the counting wheels of the total register.

6. In a cash register, the combination of a daily register including separate counting wheels and rotatable spindles for individually actuating said counting wheels, a total register including separate counting wheels normally in coöperative relation to the counting wheels of the daily register, said counting wheels of the daily register operating to directly actuate the counting wheels of the total register, means for simultaneously adjusting the counting wheels of the total register into and out of coöperative relation with the counting wheels of the daily register, and manually operable means for resetting the counting wheels of the daily register to zero when the counting wheels of the total register are free from engagement therewith.

7. In a cash register, the combination of a daily register including a plurality of separate counting wheels and rotatable spindles for individually operating said counting wheels, a total register including counting wheels operated directly by the counting wheels of the daily register, means for adjusting the counting wheels of the total register into and out of operative relation to the counting wheels of the daily register, separate means for resetting the counting wheels of the daily register to zero positions when free from engagement with the counting wheels of the total register, and indicating mechanism separate from the counting wheels of both of said registers and operable by said spindles of the daily register.

8. In a cash register, the combination of a daily register including separate counting wheels and a plurality of rotatable spindles adapted to individually operate said counting wheels, a total register including counting wheels operated directly by the counting wheels of the daily register, means for adjusting the counting wheels of the total register into and out of operative relation to the counting wheels of the daily register, indicating mechanism including a plurality of separate movable members, and actuating members separate from the counting wheels of either register, said actuating members being operated by said spindles of the daily register and connected with the separate members of the indicating mechanism.

9. In a cash register, a daily register including a plurality of separate counting wheels and operating spindles having means for directly actuating the individual counting wheels, a total register including counting wheels operated directly by the counting wheels of the daily register, means for adjusting the counting wheels of the total register into and out of operative relation to the counting wheels of the daily register, a plurality of indicator actuating devices each provided with a gear segment, and gears on the spindles of the daily register and meshing with said segments of the indicator actuating members.

10. In a cash register, a daily register including a plurality of separate counting wheels and a plurality of operating spindles for directly and individually actuating said counting wheels, a total register including counting wheels operated directly by the counting wheels of the daily register, means for adjusting the counting wheels of the total register into and out of operative relation to the counting wheels of the daily register, indicator operating members each having means whereby the same may be operated by one of said spindles, and locking means for precluding movement of the indicator actuating members in a reverse direction.

11. In a cash register, a daily register including a plurality of spindles and a plurality of counting wheels, a total register including counting wheels operated directly by the counting wheels of the daily register, means for adjusting the counting wheels of the total register into and out of operative relation to the counting wheels of the daily register, indicating mechanism, actuating members coöperating with said spindles of the daily register and adapted for displaying the indicating mechanism, locking devices normally in locking relation to the actuating members, and means for withdrawing the locking devices from the path of the actuating members.

12. In a cash register, a daily register having a plurality of separate counting wheels and a plurality of operating spindles each having means for operating one of the counting wheels, a total register including counting wheels operated directly by the counting wheels of the daily register, means for adjusting the counting wheels of the total register into and out of operative relation to the counting wheels of the daily register, indicating mechanism, actuating members coöperating with the respective spindles of the daily register and provided with ratchet teeth, a plurality of locking devices normally engaging with the ratchet teeth of said actuating members, and means for moving the locking devices away from said ratchet teeth of the actuating members.

13. In a cash register, a daily register including a plurality of separate counting wheels and a plurality of spindles each consisting of a tubular part and a solid part, the solid part of each spindle having a gear meshing with the counting wheels of said register mechanism, and pawl and ratchet connections intermediate the solid and tubular parts of each spindle, combined with a total register including counting wheels operated directly by the counting wheels of the daily register, and means for adjusting the counting wheels of the total register into and out of operative relation to the counting wheels of the daily register.

14. In a cash register, a daily register including a plurality of separate counting wheels, rotatable spindles having means for directly operating the counting wheels individually, and transfer devices coöperating with said counting wheels whereby the numbers on a wheel of a lower denomination may be transferred to a wheel of a higher denomination, in combination with a total register including counting wheels operated directly by the counting wheels of the daily register, means for adjusting the counting wheels of the total register into and out of operative relation to the counting wheels of the daily register, and separate resetting means whereby the counting wheels of the daily register may be returned to zero positions when said counting wheels of the daily register are free from engagement with the counting wheels of the total register.

15. In a cash register, a daily register, means for operating said daily register, a total register normally coöperating with the daily register, means for shifting the total register from coöperative relation with the daily register, means for precluding operation of either register when the total register does not coöperate with the daily register, and means for resetting the daily register to zero position when free from operative relation to the total register.

16. In a cash register, a daily register including a plurality of separate counting wheels, means for individually operating the counting wheels of said daily register, a total register having a plurality of individually operable counting wheels normally coöperating with the counting wheels of the daily register, means for shifting the counting wheels of the total register from engagement with the counting wheels of the daily register, and means for precluding operation of the machine when the total register does not coöperate with the daily register.

17. In a cash register, a daily register including a plurality of separate counting wheels, means for individually operating said counting wheels of the daily register, indicating mechanism operated normally by the means for actuating the counting wheels of the daily register, a total register having counting wheels adapted to be operated by the counting wheels of the daily register, means for shifting the total register into and from coöperative relation to the daily register, and means for precluding operation of the indicating mechanism when the total register is moved from coöperative relation to the daily register.

18. In a cash register, a daily register including a plurality of separate counting wheels, a plurality of spindles having means for directly operating the counting wheels of the daily register, indicating mechanism, a plurality of indicator operating members each having a gear segment, spring pressed gears slidable on the operating spindles and normally meshing with the gear segments of said members, a throw-off plate slidable with respect to the members and operable to move the gears from meshing engagement with the gear segments of said members, a spindle, means intermediate the spindle and the throw-off plate for positively moving said throw-off plate in one direction, means for locking said last mentioned spindle, a total register normally coöperating with the daily register, and actuating means for moving the total register from coöperative relation with the daily register at the time the locking means is operated to move the throw-off plate.

In testimony whereof I have signed my name to this specification in the presence of two subscribing witnesses.

FERDINAND KRONENBERGER.

Witnesses:
  JAS. H. GRIFFIN,
  H. I. BERNHARD.

---

Copies of this patent may be obtained for five cents each, by addressing the "Commissioner of Patents, Washington, D. C."